United States Patent
Esteves et al.

(10) Patent No.: US 8,902,806 B2
(45) Date of Patent: Dec. 2, 2014

(54) REPEATER-ASSISTED MANAGEMENT OF MACRO NETWORK COVERAGE

(75) Inventors: Eduardo S. Esteves, San Diego, CA (US); Dhananjay Ashok Gore, San Diego, CA (US); Mahesh A. Makhijani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 13/069,234

(22) Filed: Mar. 22, 2011

(65) Prior Publication Data

US 2011/0235568 A1    Sep. 29, 2011

Related U.S. Application Data

(60) Provisional application No. 61/317,180, filed on Mar. 24, 2010.

(51) Int. Cl.
| | | |
|---|---|---|
| H04B 7/14 | (2006.01) | |
| H04J 1/10 | (2006.01) | |
| H04J 3/08 | (2006.01) | |
| H04W 4/00 | (2009.01) | |
| H04B 7/155 | (2006.01) | |
| H04B 7/26 | (2006.01) | |
| H04W 16/00 | (2009.01) | |
| H04W 16/26 | (2009.01) | |
| H04W 24/02 | (2009.01) | |
| H04W 84/04 | (2009.01) | |

(52) U.S. Cl.
CPC .......... *H04B 7/15528* (2013.01); *H04B 7/1555* (2013.01); *H04W 24/02* (2013.01); *H04B 7/2606* (2013.01); *H04W 16/00* (2013.01); *H04W 84/047* (2013.01); *H04B 7/15507* (2013.01); *H04B 7/15578* (2013.01); *H04B 7/15535* (2013.01); *H04W 16/26* (2013.01)

USPC ........................................ 370/315; 455/422.1

(58) Field of Classification Search
CPC ........... H04B 7/15535; H04B 7/15528; H04B 7/1555; H04B 7/15; H04B 7/155; H04B 7/14; H04W 16/00; H04W 16/26; H04W 84/047
USPC ........................................ 370/315; 455/421.1
See application file for complete search history.

(56) References Cited

U.S. PATENT DOCUMENTS

| | | |
|---|---|---|
| 2003/0013410 A1 | 1/2003 | Park |
| 2005/0176368 A1 | 8/2005 | Young et al. |

(Continued)

FOREIGN PATENT DOCUMENTS

| | | | |
|---|---|---|---|
| JP | 2010041685 A | 2/2010 | |
| WO | WO9829962 A2 | 7/1998 | |

(Continued)

OTHER PUBLICATIONS

International Search Report and Written Opinion—PCT/US2011/029674, ISA/EPO—Jun. 22, 2011.

(Continued)

*Primary Examiner* — Kwang B Yao
*Assistant Examiner* — Adam Duda
(74) *Attorney, Agent, or Firm* — Jennifer M. Pascua (57) ABSTRACT

A method of managing macro network coverage among a plurality of repeaters deployed to extend coverage of one or more base stations may include receiving feedback information from at least two repeaters indicative of macro network coverage at locations corresponding to each repeater, determining a coverage status of the macro network based on the feedback information, and sending a control signal to at least one repeater instructing the repeater to adjust one or more operating parameters based on the determined coverage status.

41 Claims, 4 Drawing Sheets

(56) References Cited

U.S. PATENT DOCUMENTS

| | | |
|---|---|---|
| 2008/0064354 A1 | 3/2008 | Lee et al. |
| 2008/0293360 A1 | 11/2008 | Maslennikov et al. |
| 2010/0035542 A1 | 2/2010 | Fujishima et al. |

FOREIGN PATENT DOCUMENTS

| | | |
|---|---|---|
| WO | WO2006099209 | 9/2006 |
| WO | WO-2007055544 A2 | 5/2007 |
| WO | WO-2008015562 A2 | 2/2008 |
| WO | WO2010034341 A1 | 4/2010 |
| WO | WO-2011111113 A1 | 9/2011 |

OTHER PUBLICATIONS

Parkvall S et al., "LTE-Advanced—Evolving LTE towards IMT-Advanced", Vehicular Technology Conference, 2008, VTC 2008-Fall, IEEE 68th, IEEE, Piscataway, NJ, USA, Sep. 21, 2008, pp. 1-5, XP031352496, ISBN: 978-1-4244-1721-6.

Taiwan Search Report—TW100110191—TIPO—Jul. 22, 2013.

REPEATER-ASSISTED MANAGEMENT OF MACRO NETWORK COVERAGE

CLAIM OF PRIORITY UNDER 35 U.S.C. §119

The present Application for Patent claims priority to Provisional Application No. 61/317,180 entitled "REPEATER INCLUDING COMMUNICATION DEVICE" filed Mar. 24, 2010, and assigned to the assignee hereof and hereby expressly incorporated by reference herein.

FIELD OF DISCLOSURE

The present disclosure relates generally to repeaters, and more specifically to repeater-assisted management of macro network coverage.

BACKGROUND

Wireless communication systems and techniques have become an important part of the way people communicate. However, providing coverage can be a significant challenge to wireless service providers. One way to extend coverage is to deploy repeaters.

Figure 1:
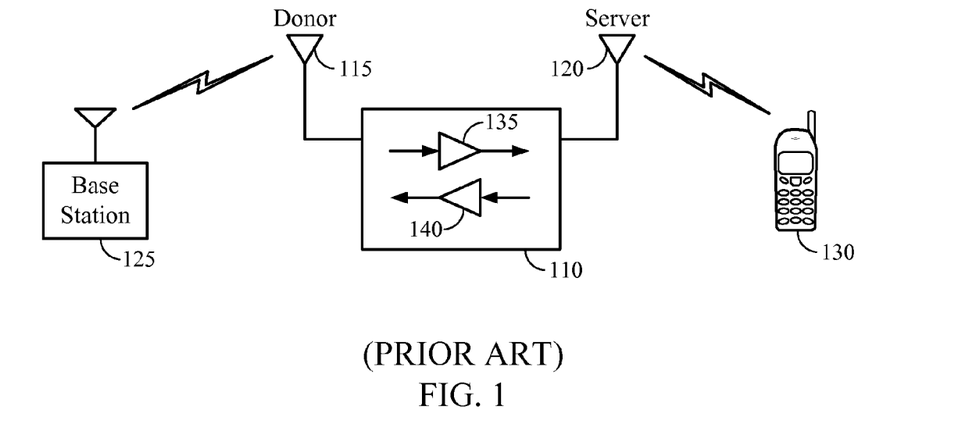
FIG. 1 illustrates a basic diagram of a repeater, in the context of a cellular telephone system.

In general, a repeater is a device that receives a signal, amplifies the signal, and transmits the amplified signal. FIG. 1 illustrates a basic diagram of a repeater 110, in the context of a cellular telephone system. The repeater 110 includes a donor antenna 115 as an example network interface to network infrastructure devices such as a base station 125. The repeater 110 also includes a server antenna 120 (also referred to as a "coverage antenna") as a mobile interface to one or more mobile devices 130. In operation, the donor antenna 115 is in communication with the base station 125, while the server antenna 120 is in communication with the mobile devices 130.

In the repeater 110, signals from the base station 125 are amplified using forward link circuitry 135, while signals from the mobile devices 130 are amplified using reverse link circuitry 140. Many configurations may be used for the forward link circuitry 135 and the reverse link circuitry 140, and there are many types of repeaters.

In some repeaters, both the network and mobile interfaces are wireless, while in others, a wired network interface is used. Some repeaters receive signals with a first carrier frequency and transmit amplified signals with a second different carrier frequency, while others receive and transmit signals using the same carrier frequency. For "same frequency" repeaters, existing repeaters use a number of techniques to manage the feedback that arises from some of the transmitted signal leaking back to the receive circuitry and being amplified and transmitted again. For example, a repeater may be configured to provide physical isolation between the two antennae, or other techniques may be employed.

Historically, repeaters have been used by infrastructure providers to increase the coverage of cellular phone networks. The expansion of network infrastructure, including repeaters in the macro network environment, has enabled vastly improved service over the past decade. When a large number of repeaters are deployed, however, it can complicate the overall coverage of a given geographic region or neighborhood. It would therefore be desirable to be able to actively manage the impact that each device has on overall macro network coverage.

SUMMARY

Exemplary embodiments of the invention are directed to systems and methods for managing macro network coverage among a plurality of repeaters deployed to extend coverage of one or more base stations.

In accordance with one or more embodiments, a method of managing macro network coverage among a plurality of repeaters deployed to extend coverage of one or more base stations may include receiving feedback information from at least two repeaters indicative of macro network coverage at locations corresponding to each repeater, determining a coverage status of the macro network based on the feedback information, and sending a control signal to at least one repeater instructing the repeater to adjust one or more operating parameters based on the determined coverage status.

In accordance with other embodiments, an apparatus for managing macro network coverage among a plurality of repeaters deployed to extend coverage of one or more base stations may include logic configured to receive feedback information from at least two repeaters indicative of macro network coverage at locations corresponding to each repeater, logic configured to determine a coverage status of the macro network based on the feedback information, and logic configured to send a control signal to at least one repeater instructing the repeater to adjust one or more operating parameters based on the determined coverage status.

In accordance with still other embodiments, an apparatus for managing macro network coverage among a plurality of repeaters deployed to extend coverage of one or more base stations may include means for receiving feedback information from at least two repeaters indicative of macro network coverage at locations corresponding to each repeater, means for determining a coverage status of the macro network based on the feedback information, and means for sending a control signal to at least one repeater instructing the repeater to adjust one or more operating parameters based on the determined coverage status.

In accordance with still other embodiments, a non-transitory computer-readable medium comprising code, which, when executed by a machine, causes the machine to perform operations for managing macro network coverage among a plurality of repeaters deployed to extend coverage of one or more base stations may include code for receiving feedback information from at least two repeaters indicative of macro network coverage at locations corresponding to each repeater, code for determining a coverage status of the macro network based on the feedback information, and code for sending a control signal to at least one repeater instructing the repeater to adjust one or more operating parameters based on the determined coverage status.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. It will also be appreciated that the terms "forward link" and "downlink" may be used interchangeably, as well as the terms "reverse link" and "uplink."

Various wireless communication networks based on infrared, radio, and/or microwave technology may be used in implementing the techniques described herein. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SCFDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. The techniques may be used in emerging and future networks and interfaces, including Long Term Evolution (LTE) and LTE Advanced.

As discussed in the background above, repeaters may be used to reduce the effective path loss between a serving base station and a mobile user, enabling more efficient use of shared resources. Repeaters may further improve coverage for voice and data, and hence, reduce the infrastructure deployment cost to reach indoor environments. While the quality of the indoor signal directly affects an individual's voice calls, the impact on data performance may be significant to both the user and overall network capacity. Therefore, using repeaters to improve coverage helps improve data network performance for other subscribers, and increase overall system utilization for the operator.

Previous implementations of "personal" repeaters, however, have encountered a number of challenges. These include the complicated effect that repeater deployment has on the overall coverage of a given geographic region or neighborhood. The present disclosure is directed to aspects of personal repeater deployment that addresses such challenges, including configuring the repeaters to provide feedback information about the coverage status of the macro network, and configuring a network controller to control the repeaters and base station remotely in a way that better manages the impact that each device has on overall macro network coverage.

Figure 2:
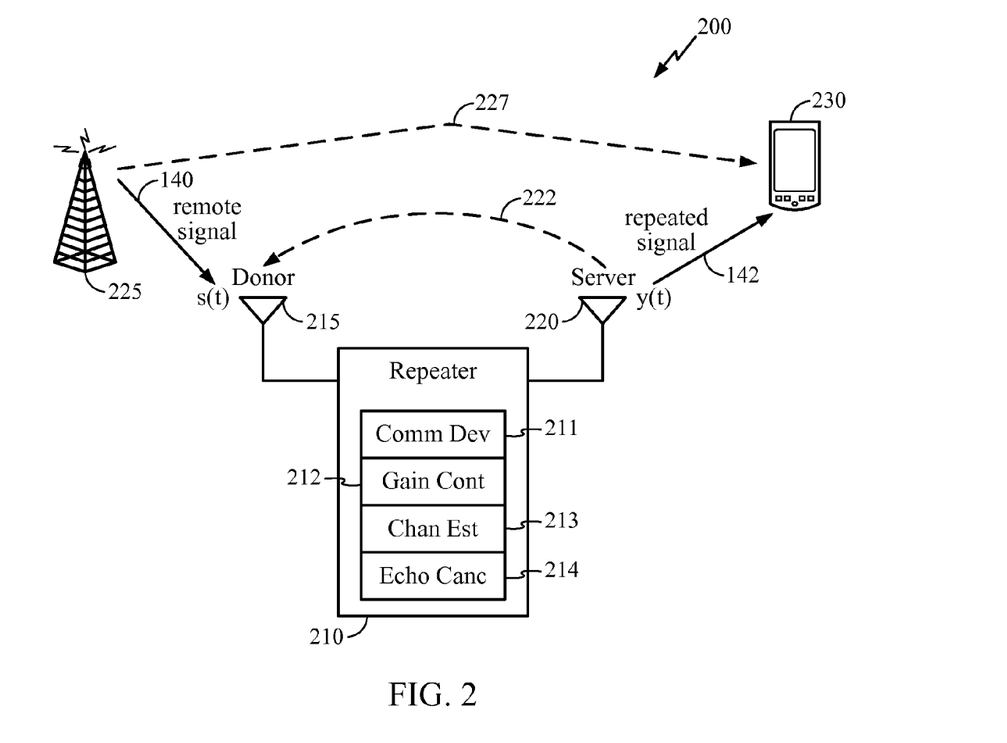
FIG. 2 shows an example of a macro network including a base station, a repeater, and a mobile device.

FIG. 2 shows an example of a macro network 200 including a base station 225, a repeater 210, and a mobile device 230. The repeater 210 may be a "single box" repeater or may include several components, such as a base unit and an external antenna connected to the base unit by a cable, as desired or appropriate for each application. The repeater 210 may be advantageously deployed in the macro network 200 when an un-repeated signal along the path 227 between the base station 225 and the mobile device 230 does not provide sufficient signal for effective voice and/or data communications received at the mobile device 230. The repeater 210 has a gain G and a delay Δ, and is configured to repeat a signal received from the base station 225 on a donor antenna 215 to the mobile device 230 using a server antenna 220. A feedback path 222 may be associated with the donor antenna 215 and the server antenna 220, as shown. The repeater 210 includes forward link (i.e., downlink) circuitry for amplifying and transmitting signals received from the base station 225 to the mobile device 230 through the donor antenna 215 and the server antenna 220. Forward link transmissions are illustrated as a remote signal 140 from the base station 225 intended for the mobile device 230, which is to be repeated as a repeated signal 142. The repeater 210 may also include reverse link (i.e., uplink) circuitry for amplifying and transmitting signals from the mobile device 230 back to the base station 225. At the repeater 210, the remote signal s(t) is received as an input signal and the remote signal s(t) is repeated as a repeated or amplified signal y(t), where $y(t)=\sqrt{G}s(t-\Delta)$. Ideally, the gain G is large, the inherent delay Δ of the repeater is small, the input signal-to-interference-plus-noise ratio (SINR) is maintained at the output of the repeater 210 (this may be particularly useful for data traffic support), and only desired carriers are amplified.

In general, the repeater 210 may incorporate channel estimation, echo cancellation, and gain control using a channel estimation module 213, a gain control module 212, and/or an echo cancellation module 214, respectively, as desired. Although the channel estimation module 213, the gain control module 212, and the echo cancellation module 214 are shown as separate entities in FIG. 2, it will be appreciated that they may be implemented in many ways.

In a communication system using many repeaters, and/or where the repeater is implemented in an environment in which technical expertise may not be available (e.g., a home or a stand-alone home office or SOHO), it may be advantageous to provide a communication device (such as a modem) in the repeater to enable communication with network resources. For some deployments in specific regions, government requirements mandate that a repeater be a manageable device, requiring a modem to be integrated with the repeater. In addition, some regions have inconsistent licensed bands in different areas, making a pre-programmed repeater channel configuration difficult or infeasible. In some designs, integrating modem functionality within the personal repeater may be used to determine which carriers belong to the desired operator, and configure itself to repeat only those carriers.

The repeater 210 shown in FIG. 2 includes a communication device 211 to enable communication with network resources. The communication device 211 may be implemented as a modem, such as a Mobile Station Modem (MSM), and may be in communication with the donor antenna 215, the server antenna 220, or both. The communication device 211 may perform a number of functions in the repeater 210, and in the network as a whole. For example, it may be advantageous to provide network operators with the ability to receive updates on the health and status of repeater operation, and to be able to turn the repeater on or off remotely. In some designs, an integrated chip set solution may be required to provide the desired features, including modem functionality (e.g., 3G modem functionality, etc.). In others, the communication device 211 may be included as a separate chip, or may be partially integrated with some other repeater circuitry.

A service provider, network operator, or other infrastructure entity may be able to control one or more aspects of the repeater 210 using communication device 211. For example, the communication device 211 may be used by a network operator to control performance and configuration aspects of one or more deployed repeaters. In some designs, short messaging service (SMS) for network management is used to address the repeater 210 via the communication device 211.

Figure 3:
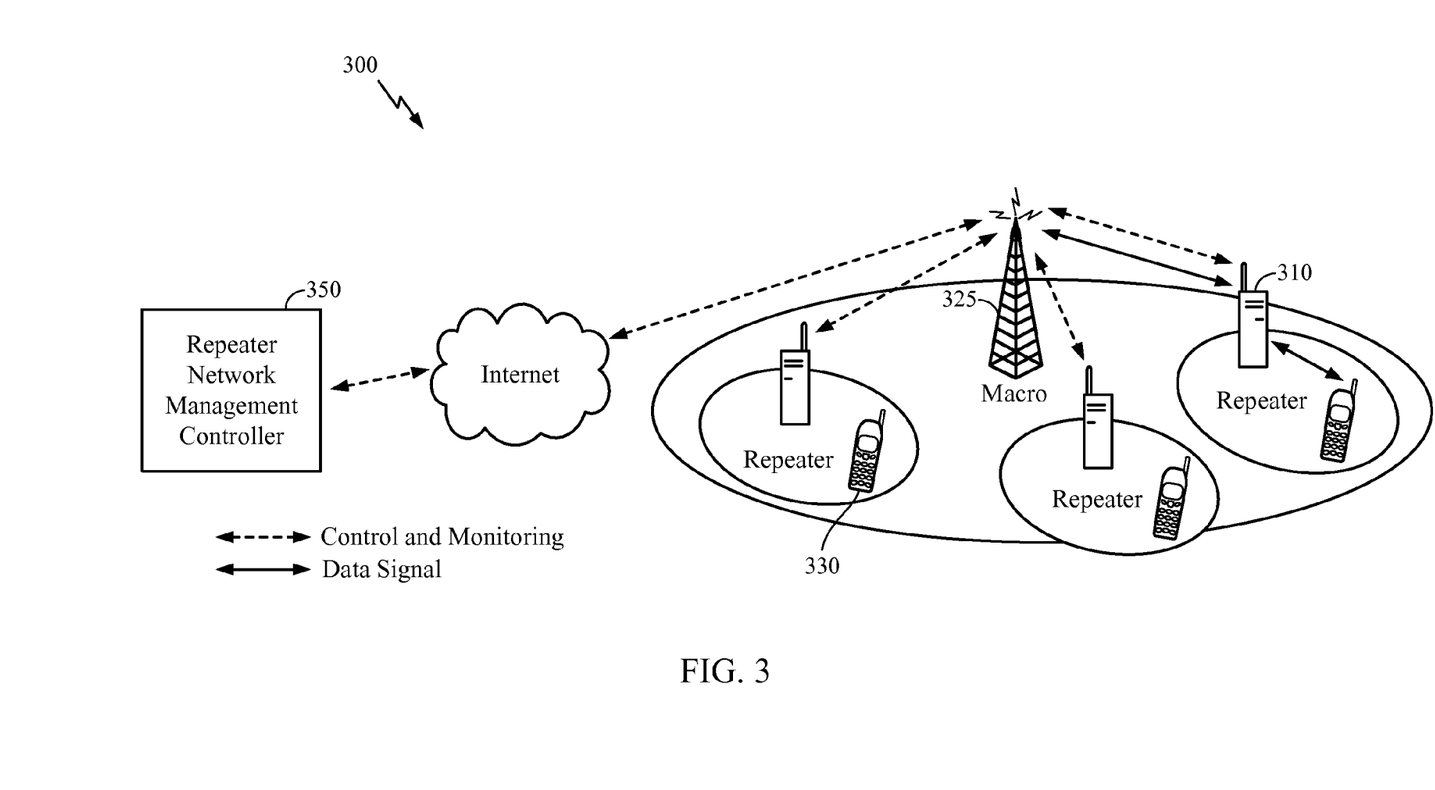
FIG. 3 illustrates an example of macro network including a plurality of repeaters, a base station, mobile devices, and a network controller.

In order to better manage the deployment of multiple repeaters in a given geographic area, a network controller may be provided to control the repeaters and/or base stations remotely, and manage the impact that each device has on overall macro network coverage. FIG. 3 illustrates an example of a macro network 300 including a plurality of repeaters 310, a base station 325, mobile devices 330, and a network controller 350. In the macro network 300, the repeaters 310 are deployed to extend coverage of the base station 325. The base station 325 and the repeaters 310 may be collectively referred to as "coverage devices." The repeaters 310 may be similar to the repeater 210 illustrated in FIG. 2 and discussed above, and may include one, several, or all of the functional components described with regard thereto. In particular, each repeater 310 in FIG. 3 includes a communication device, similar to the communication device 211 of the repeater 210 illustrated in FIG. 2, to enable communication with the network controller 350 and to make various measurements of the repeater's 310 operation and environment.

Using its embedded communication device, each repeater 310 is configured to report various feedback information to the network controller 350. As shown, the reporting may be achieved via a communication link with the base station 325, and other supporting communication paths as required (e.g., the Internet). The reported feedback information may include various signal measurements collected at the repeater 310, such as a received signal strength or quality from the base station 325, a received signal strength or quality from another repeater 310, a phase offset (e.g., a Pseudorandom Noise or PN offset) identifying some or all measurable sectors, interference information (e.g., SINR) for some or all carriers being utilized by a base station, uplink and downlink path loss estimates to each neighboring base station, etc. The reported feedback information may further include a geographic position of the repeater (e.g., GPS coordinates), a transmission power gain of the repeater, an output power level of the repeater, or any other information related to network coverage or device identification.

Based on this feedback information from the repeaters 310, the network controller 350 is able to determine a coverage status of the macro network 300. For example, the network controller 350 may estimate the network coverage status of the macro network 300 by constructing coverage models based on various path loss, signal strength, and interference measurements received from the repeaters 310. From the constructed coverage models, the network controller 350 can determine whether a repeater 310 in a given location is effectively operating to improve network coverage without creating unnecessary interference. Various coverage models known in the art may be used as appropriate for each application.

Based on the determined coverage status, the network controller 350 sends a control signal to at least one of the coverage devices instructing the coverage device to adjust one or more operating parameters. As discussed above with reference to FIG. 2, the control signal may include one or more SMS messages, IP packets, or the like, and may be forwarded over a communication link between the base station 325 and the network controller 350 for subsequent transmission to the repeater 310. The operating parameters to be adjusted may include a maximum output power level or maximum transmission power gain of the coverage device for the uplink or downlink, the carrier frequencies to be repeated or amplified, etc.

In some designs, the control signal instructs the coverage device to increase an output power level or a transmission power gain when the coverage status indicates poor coverage among the coverage devices, or to decrease the output power level or the transmission power gain when the coverage status indicates substantial interference among the coverage devices. For example, the path loss estimate from the repeater 310 to the base station 325 may be used to determine whether the maximum transmission power of the coverage device should be increased or decreased from its current level. Alternatively, if there is unnecessary clutter or redundancy of repeaters 310 in a given neighborhood, the controller 350 may decide to turn off or ramp down the transmission power gain of select repeaters 310 based on their respective geographical positions. In this way, the network controller 350 may use the feedback information from the repeaters 310 to better optimize the overall coverage footprint of the macro network 300 as a whole.

Figure 4:
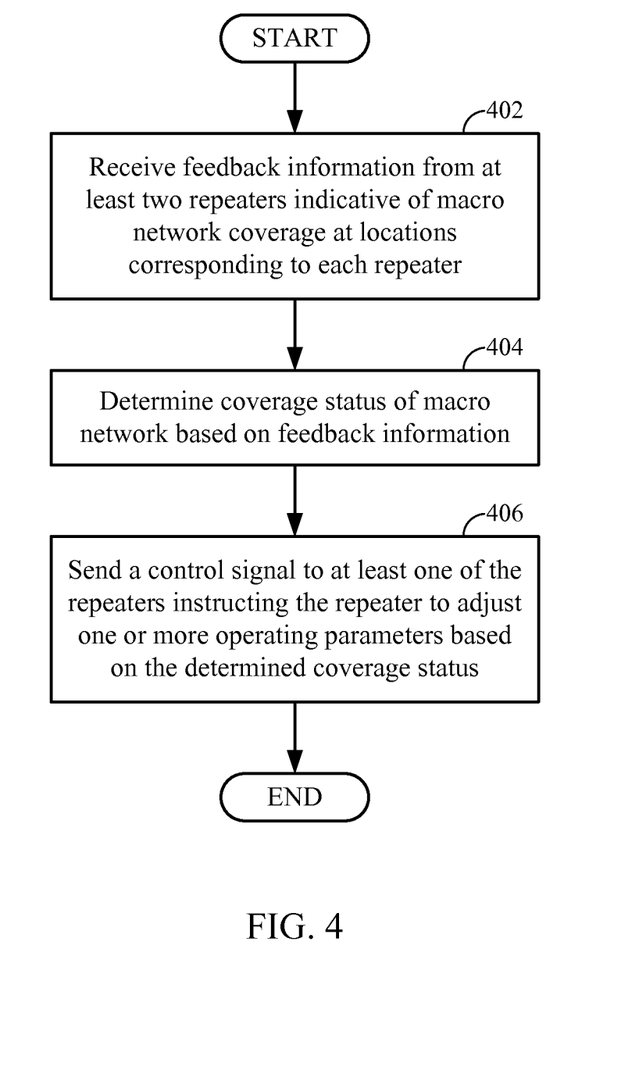
FIG. 4 is a flowchart illustrating method of managing macro network coverage among a plurality of repeaters deployed to extend coverage of one or more base stations.

FIG. 4 is a flowchart illustrating a method of managing macro network coverage among a plurality of repeaters deployed to extend coverage of one or more base stations. As shown, and with reference to FIG. 3, the network controller 350 receives feedback information from at least two repeaters 310 indicative of macro network coverage at locations corresponding to each repeater 310 (block 402). In some designs, the network controller 350 may request the feedback information from the repeaters, while in other designs the repeaters 310 are configured to automatically provide the feedback information. As discussed above, the feedback information may comprise signal measurements collected at the repeater 310. The signal measurements may comprise a received signal strength associated with the base station 325, a path loss to the base station 325, a received signal strength associated with another repeater 310, and/or a downlink signal-to-interference-plus-noise ratio. The feedback information may further comprise a geographic position, a transmission power gain, and/or an output power level of the repeater 310.

The network controller 350 then determines a coverage status of the macro network 300 based on the feedback information (block 404), and sends a control signal to at least one of the repeaters 310 instructing the repeater 310 to adjust one or more operating parameters based on the determined coverage status (block 406). Determining the coverage status may comprise constructing a coverage model for the macro network 300 based on the feedback information. The operating parameters may comprise a set of carrier frequencies to amplify, a maximum output power level, and/or a maximum transmission power gain. Uplink and downlink maximum power levels or transmission gains may be specified separately. The control signal may instruct one or more of the repeaters 310 to increase an output power level or a transmission power gain when the coverage status indicates poor coverage among the repeaters 310, or to decrease an output power level or a transmission power gain when the coverage status indicates substantial interference among the repeaters 310.

Figure 5:
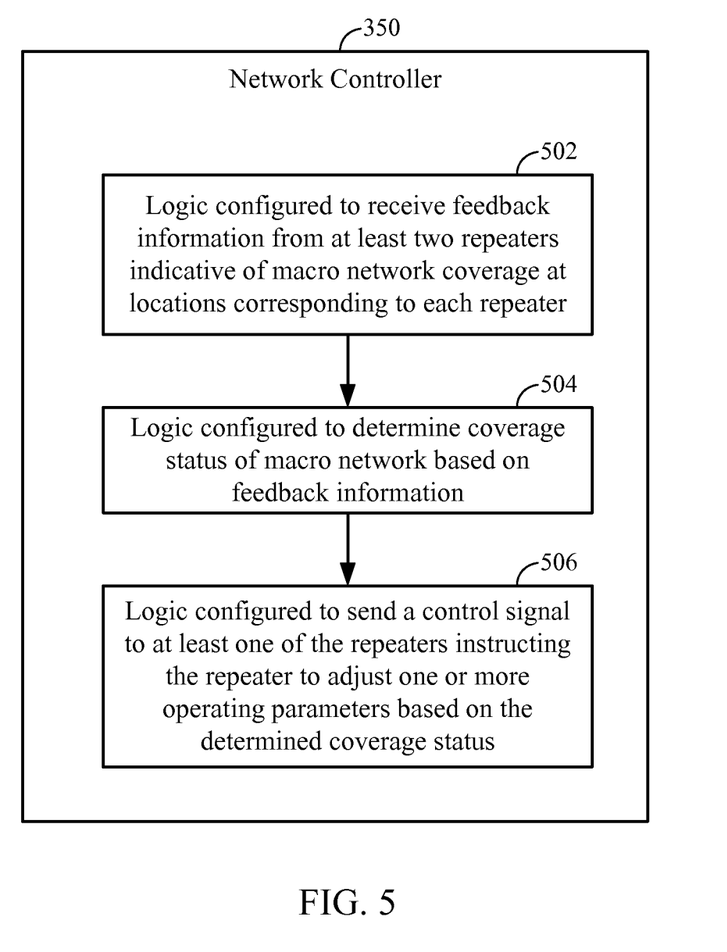
FIG. 5 illustrates an example network controller apparatus for performing operations relating to the management of macro network coverage among a plurality of repeaters deployed to extend coverage of one or more base stations.

FIG. 5 illustrates an example network controller apparatus for performing the operations described above, with reference to FIG. 4, relating to the management of macro network coverage among a plurality of repeaters deployed to extend coverage of one or more base stations. In particular, the illustrated network controller 350 includes at least logic 502 configured to receive feedback information from at least two repeaters 310 indicative of macro network coverage at locations corresponding to each repeater 310, logic 504 configured to determine a coverage status of the macro network 300 based on the feedback information, and logic 506 configured to send a control signal to at least one repeater 310 instructing the repeater 310 to adjust one or more operating parameters based on the determined coverage status.

Accordingly, a repeater suitable for indoor coverage (e.g., business, residential, or similar use) is thus provided according to the described techniques herein. The repeaters disclosed herein may be installed by trained technicians to provide expected performance. However, the increasing need for better voice and data communication in buildings (particularly in homes and stand-alone home offices or SOHOs) may be benefited by the ability to install and use a repeater with a minimum of technical expertise. Ease of installation may further reduce customer support calls, which may make personal repeaters less costly and more attractive to both end users and service providers.

In some designs, simple consumer self-installation instructions may be used to appropriately position the repeater. For example, the consumer may be instructed to use the signal strength bars on his or her mobile phone to find an area with signal, such as near a window. The consumer may then be instructed to place the repeater near this location and plug it in. If a service signal strength indication on the repeater is lit, the consumer may be alerted that the current location is an acceptable location. If the service signal strength indicator is blinking, the user may be instructed to reposition the repeater to a location with stronger signal strength. Once an operating indicator on the repeater is lit, the consumer may be instructed to confirm that the signal strength bars on his or her mobile phone have increased. Of course, many implementations are possible.

In some designs, a "single box" repeater is used so that only one indoor apparatus needs to be installed, without external antenna cables. However, while in general it may be desirable for personal repeater installations to use a single unit, self install model to minimize deployment costs, some rural or other customers may be in an exceptionally weak signal condition. Therefore, in other designs, the repeater may include an external antenna connector. One example is a deployment in a shopping mall, where the gain available in a single package may not be sufficient for the desired coverage, and an antenna may be placed at an exterior location. An external antenna connector may be provided to allow this subset of customers to have a roof eave or externally mounted antenna with a cable to the indoor unit. This arrangement may provide an additional 10 dB or more of service signal strength, for example, because of the additional height and/or elimination of significant signal blockage. It will be appreciated that in these designs additional gain may optionally be provided as well.

In another aspect, a personal repeater employing the techniques described herein may be configured to repeat multiple carriers, or may be configured to repeat a single carrier. In some designs, a repeater may be configured to repeat a software-configurable set of carriers within a given band so that the repeater may exclude some frequencies and include others, depending on the specific deployment. In some designs, upon power up, a modem in the repeater may be configured to search for service from the service provider, then receive and decode a channel list message. This list may be used to configure which channels the repeater will repeat, and which signals it will attenuate.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a repeater, a network controller, etc. In the alternative, the processor and the storage medium may reside as discrete components.

In one or more exemplary embodiments, the functions described may be implemented in hardware, software, firmware, or any combination thereof. If implemented in software, the functions may be stored as one or more instructions or code on a computer-readable medium. Computer-readable media includes storage media, and does not embrace transitory propagating signals. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of managing macro network coverage among a plurality of repeaters deployed to extend coverage of one or more base stations, the method comprising:
    employing a processor to execute computer-executable instructions stored on a computer-readable storage medium to implement the following acts:
    receiving feedback information from at least two repeaters indicative of macro network coverage at locations corresponding to each repeater;
    determining a coverage status of the macro network based on the feedback information from the at least two repeaters; and
    sending a control signal to at least one repeater instructing the repeater to adjust one or more operating parameters based on the determined coverage status.

2. The method of claim 1, further comprising requesting the feedback information from the at least two repeaters by a network controller.

3. The method of claim 1, wherein the feedback information comprises signal measurements collected at the repeater.

4. The method of claim 3, wherein the signal measurements comprise a received signal strength associated with a base station, a path loss to the base station, a received signal strength associated with another repeater, and/or a downlink signal-to-interference-plus-noise ratio.

5. The method of claim 3, wherein the feedback information further comprises a geographic position, a transmission power gain, and/or an output power level of the repeater.

6. The method of claim 1, wherein determining the coverage status comprises constructing a coverage model for the macro network based on the feedback information.

7. The method of claim 6, wherein the coverage model indicates whether the at least two repeaters are interfering with one another.

8. The method of claim 1, wherein the operating parameters comprise a set of carrier frequencies to amplify, a maximum output power level, and/or a maximum transmission power gain.

9. The method of claim 8, wherein uplink and downlink maximum power levels or transmission gains are specified separately.

10. The method of claim 1, wherein the control signal instructs the repeater to increase an output power level or a transmission power gain when the coverage status indicates poor coverage among the repeaters, or to decrease an output power level or a transmission power gain when the coverage status indicates substantial interference among the repeaters.

11. The method of claim 1, wherein the control signal is sent to at least two repeaters.

12. An apparatus for managing macro network coverage among a plurality of repeaters deployed to extend coverage of one or more base stations, the apparatus comprising:
    logic circuitry configured to receive feedback information from at least two repeaters indicative of macro network coverage at locations corresponding to each repeater;
    logic circuitry configured to determine a coverage status of the macro network based on the feedback information from the at least two repeaters; and
    logic circuitry configured to send a control signal to at least one repeater instructing the repeater to adjust one or more operating parameters based on the determined coverage status.

13. The apparatus of claim 12, wherein the apparatus is a network controller and further comprises logic circuitry configured to request the feedback information from the at least two repeaters.

14. The apparatus of claim 12, wherein the feedback information comprises signal measurements collected at the repeater.

15. The apparatus of claim 14, wherein the signal measurements comprise a received signal strength associated with a base station, a path loss to the base station, a received signal strength associated with another repeater, and/or a downlink signal-to-interference-plus-noise ratio.

16. The apparatus of claim 14, wherein the feedback information further comprises a geographic position, a transmission power gain, and/or an output power level of the repeater.

17. The apparatus of claim 12, wherein the logic circuitry configured to determine the coverage status comprises logic circuitry configured to construct a coverage model for the macro network based on the feedback information.

18. The apparatus of claim 12, wherein the operating parameters comprise a set of carrier frequencies to amplify, a maximum output power level, and/or a maximum transmission power gain.

19. The apparatus of claim 18, wherein uplink and downlink maximum power levels or transmission gains are specified separately.

20. The apparatus of claim 12, wherein the control signal instructs the repeater to increase an output power level or a transmission power gain when the coverage status indicates poor coverage among the repeaters, or to decrease an output power level or a transmission power gain when the coverage status indicates substantial interference among the repeaters.

21. The apparatus of claim 12, wherein the control signal is sent to at least two repeaters.

22. An apparatus for managing macro network coverage among a plurality of repeaters deployed to extend coverage of one or more base stations, the apparatus comprising:
   means for receiving feedback information from at least two repeaters indicative of macro network coverage at locations corresponding to each repeater;
   means for determining a coverage status of the macro network based on the feedback information from the at least two repeaters; and
   means for sending a control signal to at least one repeater instructing the repeater to adjust one or more operating parameters based on the determined coverage status.

23. The apparatus of claim 22, wherein the apparatus is a network controller and further comprises means for requesting the feedback information from the at least two repeaters.

24. The apparatus of claim 22, wherein the feedback information comprises signal measurements collected at the repeater.

25. The apparatus of claim 24, wherein the signal measurements comprise a received signal strength associated with a base station, a path loss to the base station, a received signal strength associated with another repeater, and/or a downlink signal-to-interference-plus-noise ratio.

26. The apparatus of claim 24, wherein the feedback information further comprises a geographic position, a transmission power gain, and/or an output power level of the repeater.

27. The apparatus of claim 22, wherein the means for determining the coverage status comprises means for constructing a coverage model for the macro network based on the feedback information.

28. The apparatus of claim 22, wherein the operating parameters comprise a set of carrier frequencies to amplify, a maximum output power level, and/or a maximum transmission power gain.

29. The apparatus of claim 28, wherein uplink and downlink maximum power levels or transmission gains are specified separately.

30. The apparatus of claim 22, wherein the control signal instructs the repeater to increase an output power level or a transmission power gain when the coverage status indicates poor coverage among the repeaters, or to decrease an output power level or a transmission power gain when the coverage status indicates substantial interference among the repeaters.

31. The apparatus of claim 22, wherein the control signal is sent to at least two repeaters.

32. A non-transitory computer-readable medium comprising code, which, when executed by a machine, causes the machine to perform operations for managing macro network coverage among a plurality of repeaters deployed to extend coverage of one or more base stations, the computer-readable medium comprising:
   code for receiving feedback information from at least two repeaters indicative of macro network coverage at locations corresponding to each repeater;
   code for determining a coverage status of the macro network based on the feedback information from the at least two repeaters; and
   code for sending a control signal to at least one repeater instructing the repeater to adjust one or more operating parameters based on the determined coverage status.

33. The non-transitory computer-readable medium of claim 32, further comprising code for requesting the feedback information from the at least two repeaters by a network controller.

34. The non-transitory computer-readable medium of claim 32, wherein the feedback information comprises signal measurements collected at the repeater.

35. The non-transitory computer-readable medium of claim 34, wherein the signal measurements comprise a received signal strength associated with a base station, a path loss to the base station, a received signal strength associated with another repeater, and/or a downlink signal-to-interference-plus-noise ratio.

36. The non-transitory computer-readable medium of claim 34, wherein the feedback information further comprises a geographic position, a transmission power gain, and/or an output power level of the repeater.

37. The non-transitory computer-readable medium of claim 32, wherein the code for determining the coverage status comprises code for constructing a coverage model for the macro network based on the feedback information.

38. The non-transitory computer-readable medium of claim 32, wherein the operating parameters comprise a set of carrier frequencies to amplify, a maximum output power level, and/or a maximum transmission power gain.

39. The non-transitory computer-readable medium of claim 38, wherein uplink and downlink maximum power levels or transmission gains are specified separately.

40. The non-transitory computer-readable medium of claim 32, wherein the control signal instructs the repeater to increase an output power level or a transmission power gain when the coverage status indicates poor coverage among the repeaters, or to decrease an output power level or a transmission power gain when the coverage status indicates substantial interference among the repeaters.

41. The non-transitory computer-readable medium of claim 32, wherein the control signal is sent to at least two repeaters.

* * * * *